Oct. 11, 1955　　A. J. HOFRICHTER　　2,720,188
PORTABLE BIRD PERCH
Filed May 11, 1954
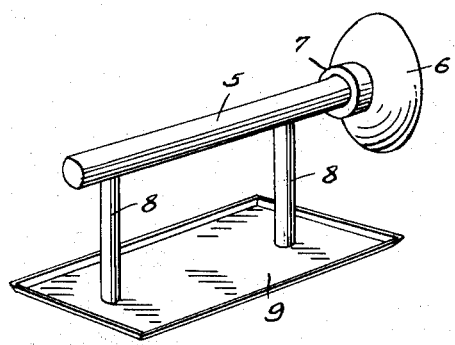
Fig. 1.
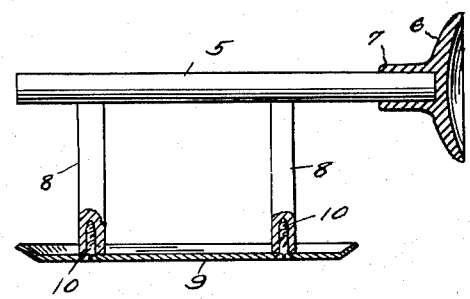
Fig. 2.
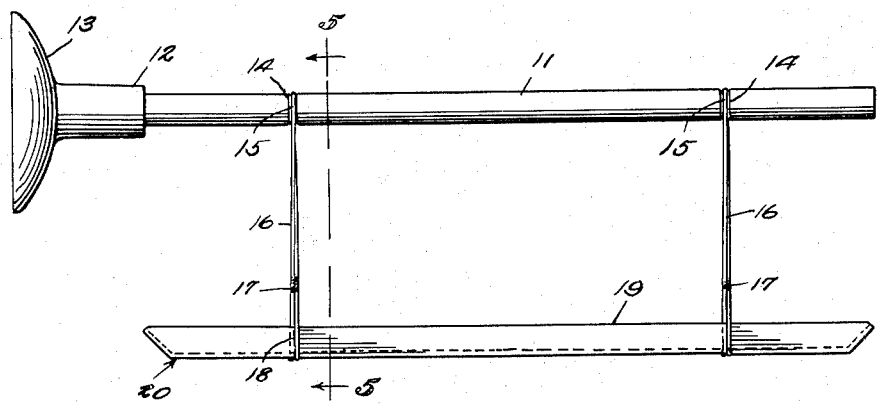
Fig. 3.
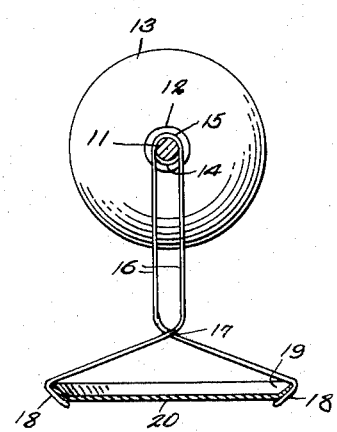
Fig. 4.
Fig. 5.
Alice J. Hofrichter
INVENTOR
BY C.A. Snow & Co.
ATTORNEYS.

United States Patent Office 2,720,188
Patented Oct. 11, 1955

2,720,188

PORTABLE BIRD PERCH

Alice J. Hofrichter, Fort Smith, Ark.

Application May 11, 1954, Serial No. 429,010

1 Claim. (Cl. 119—26)

This invention relates to a bird perch, the primary object of the invention being to provide a perch of this character which may be readily moved to various locations in a room, the perch being designed specifically for use by birds that are allowed the freedom of the room, and are only periodically confined in a cage.

An important object of the invention is to provide a portable bird perch including a dropping pan, which is supported by means of a suction cup so that the perch may be readily moved from one location to another, the dropping pan being removably held on the perch for convenience in maintaining the perch clean.

Another object of the invention is to provide a perch which has swivel connection with its support, thereby providing means for securing a ferris wheel or swing to the support to convert the perch into a toy.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is a perspective view of a portable perch, constructed in accordance with the invention.

Figure 2 is a side elevational view thereof, parts of the dropping pan being shown in section.

Figure 3 is an enlarged side elevational view of a modified form of the invention.

Figure 4 is a vertical sectional view taken on line 4—4 of Figure 3.

Figure 5 is a further modified form of the invention.

Referring to the drawing in detail, the invention comprises the main perch indicated generally by the reference character 5 which is constructed of a length of wood or other suitable material, circular in cross section, the main perch being supported by the suction cup 6 which is formed with a socket 7, in which one end of the main perch is positioned.

Depending from the main perch 5 at points in spaced relation with respect to each other, are the vertical supporting posts 8 to which the dropping pan 9 is secured, as by means of the screws 10 which are shown as passing through openings in the dropping pan 9 and passing into the lower ends of the vertical supporting posts 8.

In the form of the invention as shown by Figures 3 and 4 of the drawing, the main perch which is indicated by the reference character 11 is also constructed preferably of wood or other suitable material and has one end thereof extended into the socket member 12 of the suction cup 13.

The main perch is provided with annular grooves 14 which are spaced apart on the main perch 11, the annular grooves being provided to receive the loops 15 of the supporting wires 16, which wires 16 cross each other at 17.

The free ends of the wires 16 extend downwardly and inwardly at 18 to hook under the marginal flange 19 of the dropping pan 20. Thus it will be seen that by forcing the wires 16 laterally, the ends 18 of the wires may be forced out of contact with the marginal flange 19 of the dropping pan 20, releasing the dropping pan so that it may be readily cleaned.

It will also be seen that due to the construction of this perch, the perch may be readily moved from one place to another in a room, so that the bird using the perch may be where the bird likes to spend its time, as for example, on the mantel mirror, dresser mirror, wall mirror or a window where the bird can view the area exteriorly of the room.

In the form of the invention as shown in Figure 5 of the drawing, the suction cup 21 is provided with a socket 22 in which the sleeve 23 is mounted for rotary movement. The perch which is indicated by the reference character 24 is secured within the sleeve 23 by means of the screw 25, the sleeve acting as a swivel to permit rotation of the perch 24. With this type of perch, it is obvious that a small ferris wheel or swing may be attached to the perch 24 the perch affording means for supporting a toy.

Having thus described the invention, what is claimed is:

A perch and dropping pan of the class described, comprising a support embodying a vacuum cup, a perch stick with spaced apart annular grooves, said perch stick secured at one of its ends to said vacuum cup supporting the perch stick in a horizontal position, supporting wires looped around said perch stick, in said annular grooves each supporting wire comprising a length of wire material bent upon itself providing a pair of yieldable arms crossed intermediate their ends with portions thereof extended laterally providing hooks yieldingly engaging the edges of the dropping pan, supporting such pan.

References Cited in the file of this patent

UNITED STATES PATENTS

| D. 86,014 | Diller | Jan. 19, 1932 |
| 230,993 | Bishop | Aug. 10, 1880 |
| 910,298 | Lindemann | Jan. 19, 1909 |
| 2,484,343 | Hawes | Oct. 11, 1949 |
| 2,675,781 | Bielefeld | Apr. 20, 1954 |